Figure 2:
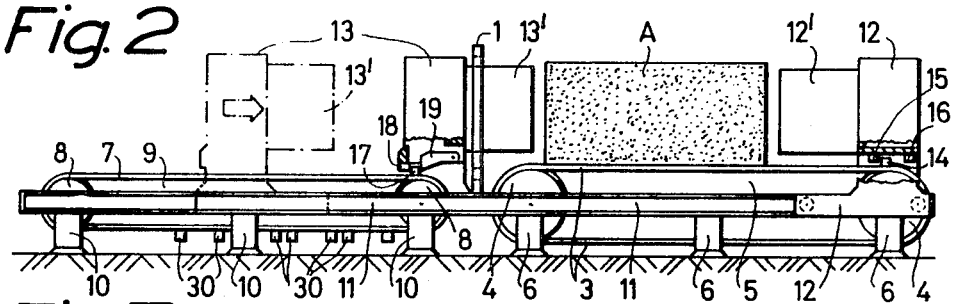

United States Patent

Godin et al.

[15] 3,646,643
[45] Mar. 7, 1972

[54] APPARATUS FOR CUTTING SEMIPLASTIC BODIES OF CELLULAR LIGHTWEIGHT CONCRETE

[72] Inventors: Stig Olof Godin, Enskede; Karl Robert Larsson, Solna, both of Sweden

[73] Assignee: International Siporex Aktiebolaget, Stockholm, Sweden

[22] Filed: Oct. 9, 1970

[21] Appl. No.: 79,390

[30] Foreign Application Priority Data

Oct. 24, 1969 Sweden.............................14569/69

[52] U.S. Cl..............................................83/112, 198/102
[51] Int. Cl..................................................B28b 11/14
[58] Field of Search..................25/105, 106, 107, 108, 113, 25/DIG. 8, 111, 112; 198/82, 102, 179, 210, 25

[56] References Cited

UNITED STATES PATENTS 3,492,703 2/1970 Bergling...............................25/112
3,529,331 9/1970 Putin....................................25/113 X
3,173,185 3/1965 Bergling...............................25/107 X
3,088,186 5/1963 Mennitt................................25/107 X
3,059,306 10/1962 Hamilton.............................25/107

Primary Examiner—Robert D. Baldwin
Assistant Examiner—John S. Brown
Attorney—Fred C. Philpitt

[57] ABSTRACT

In an apparatus for cutting semiplastic bodies of unhardened cellular lightweight concrete, each body is passed through a cutting frame while being transferred from a first to a second conveyor under the actuation of a positively driven pusher movable along the first conveyor, which is a free-running belt conveyor, and while being pressed against the pusher by a counterholder movable along the second conveyor, which is an endless, free-running one having a body-receiving surface composed of spaced transverse bars of a sufficient height to permit the free prongs of a fork lifter forming part of the apparatus to enter between them for lifting away the body when cutting thereof is accomplished.

4 Claims, 8 Drawing Figures

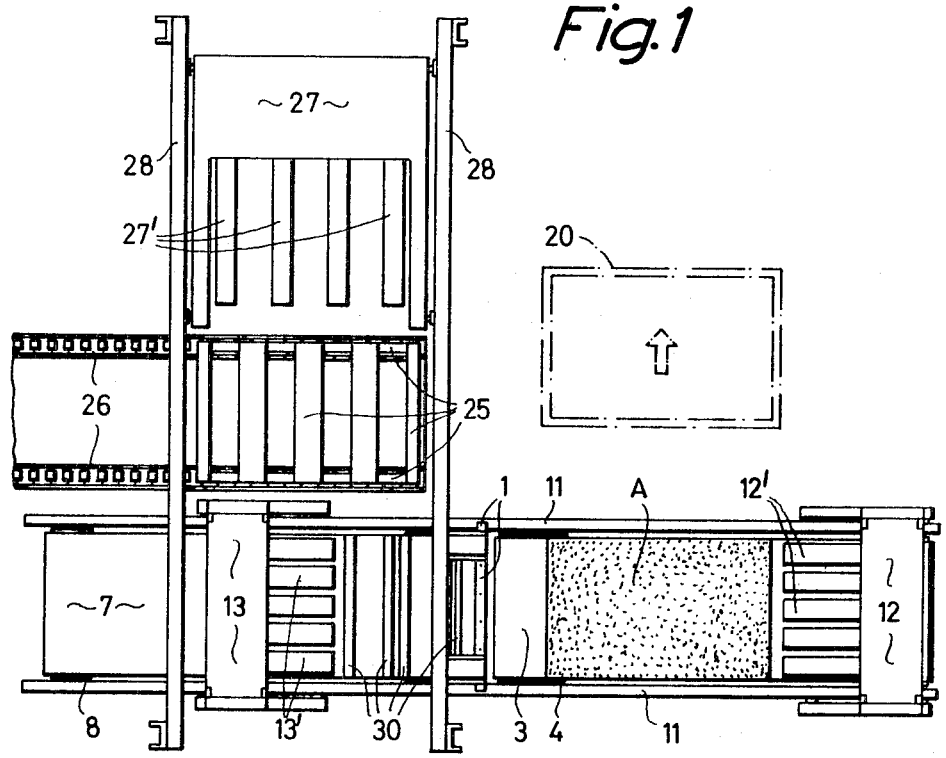
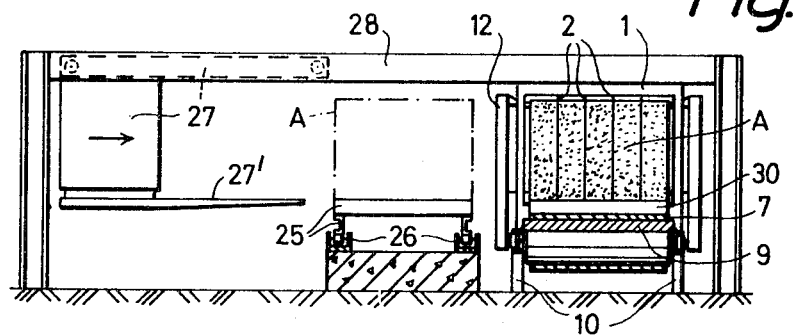
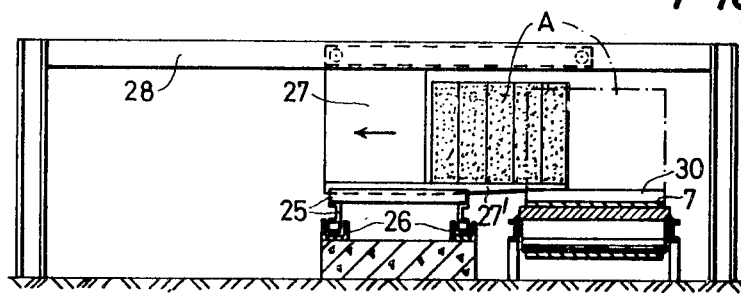

APPARATUS FOR CUTTING SEMIPLASTIC BODIES OF CELLULAR LIGHTWEIGHT CONCRETE

In the modern manufacture of cellular lightweight concrete products, such as slabs and blocks for building purposes, it is a well established practice to first produce a relatively large, porous and more or less semiplastic body by letting a specially prepared concrete mass containing a gas producing agent, usually aluminum powder, expand in a mold, and to then cut this semiplastic body into a plurality of smaller pieces, each forming a desired product. Subsequently the products are steam-hardened in an autoclave to obtain their final hardness and strength, and this latter process is preferably carried out while the cut pieces still remain collected into a large unit, so that separate handling of each piece can be avoided.

It has previously been suggested in an apparatus for cutting semiplastic cellular lightweight concrete bodies in the manner referred to hereinbefore, to pass the body to be cut with its top and bottom sides free through a substantially vertical cutting frame having a number of cutting members stretched therein while simultaneously transferring the body from a first conveyor in the form of a flexible belt running over a support at the inlet side of the cutting frame to a second, endless conveyor running over a support on the outlet side of the cutting frame. Although this suggestion is old in itself and such an apparatus may at first glance appear to be both simple and satisfactory, it is a fact that the forms thereof hitherto known very poorly meet all the various requirements justly put forward by the manufacturers, and this is believed to be the reason why equipments of this kind have never gained much success in practice.

Nowadays the semiplastic cellular lightweight concrete bodies to be cut usually are of a considerable size and above all it is common practice to give them a considerable length, e.g., 20 feet or more. With such large bodies it has been found that the usual manner of advancing the body through the cutting frame by pulling the conveyors, or at least the first conveyor, by means of driven rollers is very unsatisfactory, because elongation of the conveyors can then hardly be avoided and such elongation frequently causes crack formations in the body and particularly in the bottom side thereof, because the body is in fact very brittle and damageable at the time it is to be cut. To avoid this inconvenience, it has recently been suggested that the body should instead be pushed through the cutting frame by a pusher, while the two conveyors are allowed to run freely in order to only support the body and facilitate its advance under the actuation of the pusher.

This latter suggestion, however, does not solve all the intricate problems involved in providing a simple and at the same time effective and rationally working apparatus for cutting and handling large and still unhardened cellular concrete bodies. Thus, a very important problem remains, viz., how to effectively eliminate the risk of damaging the body when the same with its bottom side free and unsupported is caused to pass the gap between the two conveyors, where a downward deflection of the body very easily occurs. For various reasons it is practically impossible to reduce said gap to such an extent that the passage of the body over the same will be entirely safe. Another important problem is, how to accomplish a transfer of the ready-cut body without damaging it and without again closing the cuts made therein from the second conveyor to a suitable, separate hardening support in a simple manner.

It is the object of the present invention to offer a favorable solution of these problems and to also indicate in what manner an apparatus of the kind referred to hereinbefore can be improved for successful use within the cellular concrete industry.

In accordance with this invention there is provided an apparatus for the purpose mentioned comprising a substantially vertical cutting frame having a number of cutting members stretched therein, through which frame the body to be cut is intended to be passed with its bottom side free while being transferred from a first conveyor in the form of a flexible belt running over a support at the inlet side of the cutting frame to a second, endless conveyor running over a support at the outlet side of the cutting frame, and further comprising a pusher movable over the first conveyor and its support in order to push the body through the cutting frame by engaging the one end of the body while at the same time the two conveyors are running freely over their related supports to merely carry the body and facilitate its transfer, and wherein a counterholder is movable over the second conveyor and its support and adapted to exert by engaging the opposite end of the body a yieldable counterpressure against the latter during the passage of the body through the cutting frame, both said pusher and said counterholder taking the form of separate carriages movable along parallel runways extending in the running direction of the two conveyors, said second conveyor having a body-receiving surface composed of a series of transverse supporting bars being mutually spaced in the running direction of the conveyor, said supporting bars having such a height and distribution that between them are from the one side of the conveyor and immediately beneath the body received thereon insertable a plurality of fork prongs belonging to a fork lifter included in the apparatus for lifting away the cut body from said second conveyor and depositing it on a separate, gratelike hardening support.

In an apparatus embodying the invention the body to be cut will thus during its entire passage through the cutting frame be clamped between the pusher and the counterholder, whereby the risk of harmful strains, particularly tensile strains, in the body is eliminated. This is very important, because the particular design of the second conveyor will, of course, cause a variation of length of the gap over which the body has to pass, which would otherwise be rather unfavorable. On the other hand the removal of the cut body from the second conveyor will be highly facilitated by the particular conveyor design, whereby the apparatus will operate very effectively.

In a preferred embodiment of the invention the pusher as well as the counterholder is provided with contacting portions adapted for engaging the respective ends of the body, said portions projecting towards the cutting frame and being adapted to partially penetrate through the latter in order to push and meet, respectively, the body a certain distance away from the remote side of the cutting frame. In this manner the end portions of the body will also be effectively protected during their passage over the gap between the two conveyors, and at the same time the pusher will become capable of moving the entire body over to the second conveyor. In other words, the contacting portions should be long enough to span the entire gap between the two conveyors.

In order to also avoid possible damage to the body be wear because of slippage between the bottom side of the body and the first conveyor, which may occur if the conveyor should seize and, in particular, when the body is just about to leave the first conveyor so that only a minor part of its weight is resting thereon, it is advantageous to provide the pusher and the first conveyor with interengageable coupling means which are so arranged and designed that the pusher, if a slippage occurs between the body and the first conveyor, will very soon positively engage and drive said first conveyor and, hence, actuate both the body and the conveyor at the same time. It should be noted that such direct actuation of the conveyor belt by the pusher behind the body does not involve the same risk of disadvantageous elongation of the conveyor belt as if the latter were driven through its own conducting rollers.

A further advantageous feature of a preferred form of the apparatus embodying the present invention is that the counterholder in a releasable manner is so coupled to the second conveyor that the latter will thereby be positively forced to move with the cut body received thereon when the counterholder is caused to move backwards by the pressure exerted thereon through the body itself, the counterholder being then released from the second conveyor at a predetermined stop position for the latter in order to subsequently move alone a further distance backwards to disengage the related end of the body. In this manner the cut body received on the second conveyor will be stopped in a predetermined position suitable for its removal from the conveyor, in which position the beforementioned fork lifter is immediately ready to go into action, and the counterholder is separated from the cut body in order not to interfere with the removal of the latter from the second conveyor. Of course, when the counterholder is separated from the cut body, the pusher is also separated from the same and preferably at once returned to its starting position, so that the first conveyor will be ready for receiving a new, uncut cellular concrete body.

Figure 3:
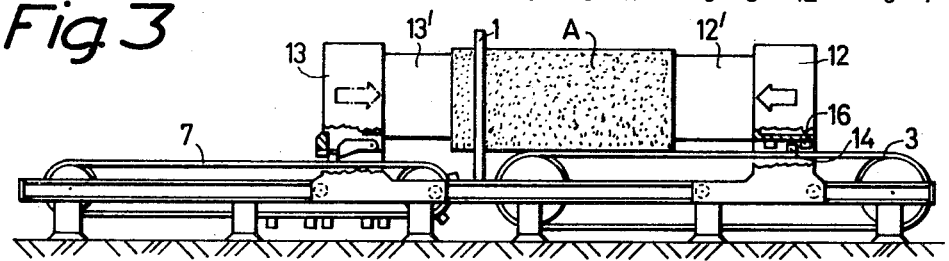
Figure 4:
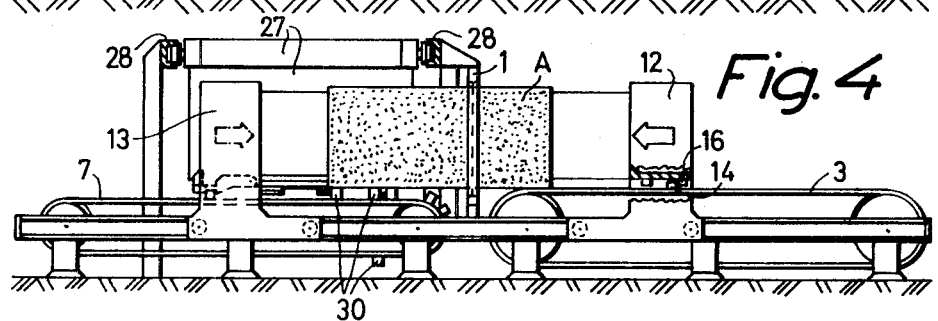
Figure 5:
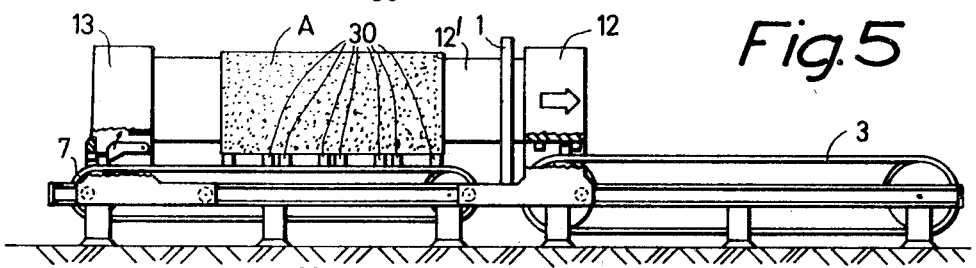
Figure 6:
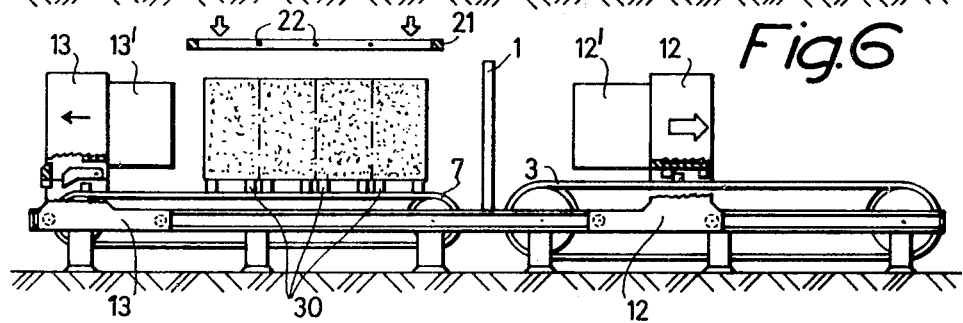

For further elucidation of the invention a preferred embodiment thereof will now be described with reference to the accompanying drawings. In the drawings:

FIG. 1 is a plan view of an apparatus for cutting semiplastic cellular lightweight concrete bodies, FIG. 2 is a simplified side view, partly in section, illustrating the position of the main parts of the apparatus when the body to be cut is deposited on the first conveyor, FIG. 3 is a side view similar to FIG. 2 and illustrating a subsequent step of operation, FIG. 4 is a more detailed side view, partly in section, illustrating a further step of operation of the apparatus, FIG. 5 is a side view similar to that of FIGS. 2 and 3 and illustrating the position of the main parts of the apparatus when the longitudinally cut body is just entirely received on the second conveyor, FIG. 6 is a side view substantially similar to those before and illustrating the position of the main parts of the apparatus when possible transverse cutting of the body is accomplished and the body is otherwise ready to be removed, FIG. 7 is an end view, partly in section, of the apparatus as seen from the left in FIG. 1, the counterholder being entirely removed for clarity, and FIG. 8 is an end view similar to that of FIG. 7 but illustrating the lifting away of the cut body from the second conveyor to a separate hardening support by means of a fork lifter forming part of the apparatus.

In all the various figures of the drawings 1 designates a vertical cutting frame in which a number of vertical cutting wires 2 are stretched (see particularly FIG. 7). In the cutting frame proper or its immediate vicinity there may also be arranged other means (not shown) for cutting or otherwise working the semiplastic porous body A passing through the cutting frame. At the inlet side of the cutting frame it a first conveyor 3 comprising an endless, flexible belt running over freely rotating conducting rollers 4 and over a supporting table arranged between them and forming part of a conveyor support having legs 6. At the opposite side, i.e., the outlet side, of the cutting frame 1 is a second conveyor 7 comprising an endless, flexible belt running over freely rotating conducting rollers 8 and a supporting table 9 arranged between them and forming a stationary conveyor support having legs 10. It should be noted that the conveyor 7 is not necessarily a belt but may consist of parallelly running chains or the like, because it does not in itself have to carry the cut body A as will appear from the following.

On opposite sides of the two conveyor supports there is mounted a pair of parallel beams 11 extending in the running direction of the conveyors. Besides assisting in supporting the cutting frame 1 between the two conveyors these two beams 11 serve as runways for a pusher 12 and a counterholder 13, which are both formed as carriages straddling their respective conveyors 3 and 7 and being movable along the beams 11 independent of each other and also basically independent of the respective conveyors. From a general point of view the pusher 12 and the counterholder 13 are mirror pictures of each other but show certain small differences as will appear from the following. Both the pusher and the counterholder has on its side facing the cutting frame 1 and above the related conveyors 3 and 7 a group of protruding, slablike contacting portions 12' and 13', respectively, adapted for engaging the respective ends of the cast body A and these contacting portions are so formed and arranged in relation to the cutting members 2 of the cutting frame 1 that they can to a certain extent penetrate through the latter as can be seen from FIGS. 2 and 5. More particularly the free length of the contacting portions 12' and 13', respectively, is so chosen that these portions can span the entire gap between the two conveyors when the pusher and the counterholder, respectively, take their positions closest to the cutting frame 1.

In a manner not shown but well known per se, both the pusher 12 and the counterholder 13 are equipped with driving motors of their own, so that they may be positively moved along their respective parts of the runway-forming beams 11 in either direction. The driving motor of each is supposed to be an electric motor transmitting power through suitable clutch means to toothed wheels or sprocket wheels engaging with racks or chains, not shown, arranged in the runway-forming beams 11. The driving mechanism of the counterholder 13 is also of such a kind that it is capable of braking the counterholder in a yieldable and controllable manner, when the latter is forced to move backwards during the advance of the body A through the cutting frame 1, as will appear from the following.

It should be understood, however, that it is possible as an alternative to drive the pusher 12 as well as the counterholder 13 by means of wires or chains from stationary motors, and in certain cases it is also possible to entirely omit the driving mechanism for the counterholder 13, viz., if additional means including spring members are provided for connecting together the pusher and the counterholder in such a manner that the body A will be clamped endwise between them during its passage through the cutting frame 1. In such a modified arrangement the spring members provide the desired counterpressure on the body A which is otherwise produced by yieldably braking the counterholder 13. Other movements of the counterholder, such as the return movement thereof, must then be manually effected.

As previously set forth, the two conveyors 3 and 7 are basically free-running, i.e., they are not provided with any driving means of their own. However, on the upper side of the conveyor belt 3 there is secured a projection 14 in the form of a cross member, and the pusher 12 is on the lower side of the part thereof extending across the conveyor belt 3 provided with two mutually spaced projections or cross pieces 15 and 16, respectively, which are arranged to alternately engage with the projection 14 of the conveyor 3 under certain conditions for directly actuating and driving the latter. More specifically the projection 15 located nearest to the cutting frame 1 on the pusher 12 is adapted to engage with the projection 14 for returning the conveyor belt 3 to its starting position as illustrated in FIG. 6, when the pusher 12 is returned after having completed a full stroke towards the left for passing a body A through the cutting frame 1.

The second projection 16 on the pusher 12 is normally kept out of engagement with the projection 14 (FIG. 3) as long as the main portion of a body A is still resting on the conveyor 3 but will on the other hand go into driving engagement with the projection 14 as soon as a small slippage occurs between the bottom side of the body A and the conveyor belt 3, and it should be understood that this will be the case particularly when the body A has been advanced so far through the cutting frame 1 that it is just about to entirely leave the first conveyor 3 as shown in FIG. 4. In this position of the body, the friction between the bottom side thereof and the conveyor 3 will normally become too small so that slippage cannot be avoided. Of course, the described cooperation of the projections 14 and 16 will assure that the body A will not be subjected to damage or wear on its bottom side as a result of slippage between the body and the conveyor belt 3.

In addition, the counterholder 13 and the conveyor 7 related thereto are also adapted to be releasably coupled together and for this purpose the conveyor 7 has on its upper side a projection or cross member 17 cooperating on the one hand with a fixed abutment 18 on the lower side of the part of the counterholder 13 extending across the conveyor 7 and on the other hand with a releasable locking device 19 in the form of a swingable hook. As long as cutting of a body A is taking place, the projection 17 is locked between the abutment 18 and the locking device 19 so that the conveyor 7 will be taken along by the counterholder 13, when the latter is moving along the beams 11. However, when the counterholder reaches a predetermined stop position illustrated in FIG. 5, the locking device 19 will, preferably automatically, be swung up to release the counterholder, whereupon the latter will be moved a further distance backwards as illustrated in FIG. 6 so that the contacting portions 13' thereof are disengaged from the worked body A. Of course, the braking of the counterholder is interrupted when the latter has reached the position of FIG. 5 and the further backward movement of the counterholder is suitably effected by reversing the driving direction of the driving motor thereof. When the counterholder is later returned to its starting position in the direction towards the cutting frame 1, the projection 17 on the conveyor 7 will automatically fall in between the abutment 18 and the locking device 19 so that the connection is again established and the conveyor 7 is also returned to its starting position illustrated in FIG. 2.

As will appear from FIGS. 2-6 illustrating different and subsequent steps in the operation of the apparatus, cutting is effected in the following manner: At the beginning, the pusher 12 is in its right-hand end position above the conveyor 3, while the counterholder 13 is likewise in its right-hand end position above the conveyor 7 and has its contacting portions 13' penetrating through the cutting frame 1 in such a manner that the outer ends of said portions are positioned above the left-hand end of the conveyor 3, all as illustrated in FIG. 2. The semiplastic cellular concrete body A to be cut is now deposited on the conveyor 3 by means of a suitable clamp-lift device, a molding frame or the like carried by a suitable travelling crane. In FIG. 1 such a device for handling the uncut body A is indicated at 20 where it is supposed to be moving away from the conveyor 3. It is to be noted that the distance between the contacting portions 12' and 13' of the pusher 12 and the counterholder 13, respectively, is at this moment sufficiently large to permit free positioning of the body A on the conveyor 3 between them.

Now the movement of the pusher 12 towards the left is started so that the contacting portions 12' thereof will engage the left-hand end of the body A. It is to be noted that such engagement is obtained before engagement is established between the projections 14 and 16. Accordingly the pusher 12 will push the body A towards the left and the conveyor 3 will be moved along solely by the friction existing between the bottom side of the body and the conveyor belt. The counterholder 13 still remains in its right-hand end position according to FIG. 2 until the left-hand end of the body A engages the contacting portions 13' thereof. In the example shown in the drawings, where the counterholder 13 is supposed to have its own driving motor, the right hand end position of the counterholder is defined by an abutment or stop member, not shown, against which the counterholder is kept pressed by the fact that its driving mechanism strives to move it towards the right but is allowed to slip. However, when the left hand end of the body A is caused to engage the counterholder 13, the latter is forced to yield backwards, i.e., to move towards the left, while its driving motor is still striving to move it towards the right and a slip in the driving mechanism is still allowed. In this manner the body A will be clamped between the pusher 12 and the counterholder 13 in a very favorable and strengthening manner.

In FIG. 3 the forward end of the body A has already left the conveyor 3 and partly passed through the cutting frame 1, but still such a large portion of the body is resting on the conveyor 3 that the latter will be moved along by friction only. The counterholder 13 is still yieldably braked in order to exert a pressure on the body in the direction towards the pusher 12. Soon, however, the body A will reach the position illustrated in FIG. 4, where the friction between the same and the conveyor 3 becomes too small so that a small slippage will occur between the body and the conveyor belt and, when this happens, the pusher 12 will make a slight movement relative to the conveyor 3 so that engagement is very soon established between the projections 14 and 16 as described hereinbefore. From now on the pusher 12 will not only push the body A but also positively drive along the conveyor 3. Finally the position illustrated in FIG. 5 is reached, where the cut body A has passed through the cutting frame 1 and been fully transferred to the conveyor 7. At this time the pusher 12 is in its left-hand end position, which is suitably defined by an abutment or stop member, not shown, and in this position the contacting portions 12' of the pusher penetrate through the cutting frame 1 and have their outer ends positioned above the right-hand end of the second conveyor 7.

From the position illustrated in FIG. 5 the pusher 12 is returned to its starting position, while at the same time the braking of the counterholder 13 is interrupted and the latter is released from the conveyor 7 and moved a further distance backwards towards the left, all as illustrated in FIG. 6, so that the body A now resting on the conveyor 7 and being cut in its longitudinal direction will be entirely free. In this position the body A can, if so desired, be further cut, for example by means of an additional cutting frame 21 having cutting wires 22 stretched therein and being lowered from above over the body as indicated in FIG. 6. It should be noted, however, that the further cuts in the body A, if at all desired, can also be accomplished by any other suitable cutting means and not necessarily by means of a vertically movable cutting frame.

When the body A has been passed through the cutting frame 1 and has possibly been further cut, as just described, it rests, as illustrated in FIG. 6, on the conveyor 7 in a well-defined position and it remains to forward the cut and possibly further worked body to a steam hardening autoclave, not shown. For doing so it is necessary to transfer the cut body from the conveyor 7 to a separate, gratelike hardening support 25, which is positioned on a roller track 26 at the one side of the conveyor 7, and this transfer must be accomplished in such a manner that the cut body does not fall apart and the cuts therein are not again closed. The transfer is carried out by means of a fork lifter, generally indicated by 27, which is suspended in rails 28 and movable back and forth along the same in a direction at a right angle to the running direction of the conveyor 7. The fork lifter 27 has fork prongs 27' which are vertically adjustable in synchronism and which register with the spaces between the cross members of the gratelike hardening support 25.

In order to permit the fork prongs 27' to enter beneath and to lift the cut body A, when the latter is resting on the conveyor 7 in the position shown in FIG. 6, the body-receiving surface of the conveyor 7 is formed by a series of transverse, raised supporting bars or beams 30, which are all of such a uniform height and so mutually spaced in the running direction of the conveyor 7 that the prongs 27', when they occupy a lowered position, are insertable in their full length from the one side of the conveyor between said bars or beams 30. To effect this, the fork lifter 27 is moved from a remote position of rest, shown in FIGS. 1 and 7, towards the conveyor 7 until its prongs 27' enter between the supporting bars 30 and extend under the full width of the body A. Thereafter the prongs 27' are elevated sufficiently to let them take over the body A from the conveyor 7, whereupon the fork lifter together with the lifted body is moved towards the left, as illustrated in FIG. 8, to an intermediate position where the body by lowering the prongs 27' will be deposited on the hardening support 25. Then the fork lifter 27 is, of course, promptly returned to its position of rest, so that the hardening support 25 with the cut body A resting thereon can be rolled away to the autoclave.

As will be readily understood, the previously described releasable connection 17-19 between the counterholder 13 and the second conveyor 7 will assure that the raised supporting bars 30 on the latter become distributed in a predetermined manner under the cut body A, when the latter is received on the conveyor 7. This is not only desirable in order to obtain a favorable distribution of load on the supporting bars 30 of the conveyor 7 as well as on the prongs of the fork lifter 27, when the cut body is to be lifted away, but will also make the conveyor 7 particularly suited for use as a cutting bed, when the possible final cutting of the body, for instance by means of the additional cutting frame 21 as shown in FIG. 6, is accomplished. With the grouping of the supporting bars 30 in pairs under each vertical cut to be made, as indicated in FIG. 6, the cutting wires 22 of the additional cutting frame 21 may entirely pass through the body A in the downward direction and enter the smaller spaces between the supporting bars, whereby possible risks that the cutting wires shall break away pieces from the lower side of the body when passing therethrough are practically eliminated.

It is suitable to give the supporting bars 30 of the conveyor 7 a sufficient height to make it possible for the cutting frame 21, if used, to remain resting temporarily on the conveyor 7 after having been lowered over the body A, until the cut body has been lifted away by means of the fork lifter 27. In this manner an undesirable return of the cutting wires 22 through the cuts produced in the body A during the downward movement of the frame 27 is avoided. Finally, when the cut body A has been lifted away, and the cutting frame 21 has been removed if ever used, the counterholder 13 is, of course, returned to its starting position shown in FIG. 2, as has been previously described, so that the apparatus is again ready for taking care of a new semiplastic cellular concrete body to be cut.

We claim:

1. An apparatus for cutting semiplastic bodies of unhardened cellular lightweight concrete comprising a substantially vertical cutting frame having a number of cutting members stretched therein, a first body supporting conveyor comprising a flexible belt running freely over a first support at the inlet side of said cutting frame, a second body supporting endless conveyor running freely over a second support at the outlet side of said cutting frame, said second conveyor having a body receiving surface composed of a series of transverse and raised supporting bars which are spaced in the running direction of the related conveyor, means forming parallel runways extending along said first and second conveyors, a positively movable pusher operative to move over and along said first conveyor and to engage the one end of a body to be cut received on said first conveyor for pushing this body through the cutting frame, a counterholder movable over and along said second conveyor and adapted to engage the opposite end of the body, both said pusher and said counterholder taking the form of separate carriages movable along said parallel runways, means for exerting on the body to be cut through said counterholder a yieldable pressure in the direction towards said pusher when the body is pushed through the cutting frame by the latter, a separate gratelike hardening support adapted to receive the cut body from said second conveyor and having raised body supporting portions spaced in a manner to substantially correspond to said supporting bars of the second conveyor, and a fork lifter movable in a direction transversing the running direction of the conveyors and having a plurality of vertically adjustable prongs adapted to enter between said raised supporting bars of said second conveyor and also between said raised supporting portions of said hardening support for lifting the cut body received on said second conveyor over to said hardening support.

2. An apparatus according to claim 1, wherein said pusher and said counterholder are both provided with body contacting portions projecting towards said cutting frame and adapted to penetrate through the latter for engaging the body to be cut above the adjacent end of the opposite conveyor.

3. An apparatus according to claim 1, wherein said pusher and said first conveyor have interengageable coupling means permitting the pusher to move a short distance in either direction relative to the conveyor without driving the latter in order to let the pusher normally actuate the body to be cut alone, when the latter is pushed through said cutting frame, but to very soon establish driving contact also with the first conveyor, should slippage occur between the body and said conveyor.

4. An apparatus according to claim 1, wherein releasable coupling means are provided between said counterholder and said second conveyor in order to let the counterholder normally take along the conveyor when forced backwards by the pressure exerted thereon through the body to be cut for thereby defining the position of the cut body relative to said supporting bars of the second conveyor, said coupling means being releasable for subsequently disengaging the counterholder from the cut body, before the latter is to be removed from said second conveyor.

* * * * *